United States Patent
Sartori et al.

(10) Patent No.: US 7,933,238 B2
(45) Date of Patent: Apr. 26, 2011

(54) METHOD AND APPARATUS FOR TRANSMISSION WITHIN A MULTI-CARRIER COMMUNICATION SYSTEM

(75) Inventors: Philippe J. Sartori, Algonquin, IL (US); Kevin L. Baum, Rolling Meadows, IL (US); Brian K. Classon, Palatine, IL (US); Arvind Krishnamoorthy, Arlington Heights, IL (US); Robert T. Love, Barrington, IL (US); Yakun Sun, Evanston, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1060 days.

(21) Appl. No.: 11/683,030

(22) Filed: Mar. 7, 2007

(65) Prior Publication Data

US 2008/0219219 A1 Sep. 11, 2008

(51) Int. Cl.
*H04W 4/00* (2009.01)
(52) U.S. Cl. ..................................................... 370/328
(58) Field of Classification Search ................... 370/328
See application file for complete search history.

(56) References Cited

U.S. PATENT DOCUMENTS

| | | | |
|---|---|---|---|
| 7,126,996 B2 | 10/2006 | Classon et al. | |
| 7,468,961 B2 | 12/2008 | Ito | |
| 7,609,610 B2 | 10/2009 | Abe et al. | |
| 7,661,038 B2 * | 2/2010 | Li et al. | 714/704 |
| 7,664,467 B2 * | 2/2010 | Cheng et al. | 455/70 |
| 7,733,977 B2 * | 6/2010 | Kuri et al. | 375/295 |
| 2005/0047393 A1 * | 3/2005 | Liu | 370/352 |
| 2005/0068884 A1 * | 3/2005 | Yoon et al. | 370/203 |
| 2005/0105589 A1 | 5/2005 | Sung et al. | |
| 2005/0107036 A1 * | 5/2005 | Song et al. | 455/23 |
| 2007/0026810 A1 | 2/2007 | Love | |
| 2007/0153833 A1 * | 7/2007 | Chang et al. | 370/477 |
| 2007/0217540 A1 * | 9/2007 | Onggosanusi et al. | 375/267 |
| 2007/0238462 A1 * | 10/2007 | Pedersen | 455/436 |
| 2007/0258366 A1 | 11/2007 | Imamura | |
| 2008/0013610 A1 * | 1/2008 | Varadarajan et al. | 375/221 |
| 2008/0107193 A1 * | 5/2008 | Erceg et al. | 375/260 |
| 2010/0220663 A1 | 9/2010 | Sawahashi et al. | |

FOREIGN PATENT DOCUMENTS

| | | |
|---|---|---|
| JP | 2006180364 | 7/2006 |
| WO | WO03007483 * | 1/2003 |
| WO | 2006075870 A1 | 7/2006 |
| WO | 2006117665 | 11/2006 |

OTHER PUBLICATIONS

Motorola, Inc., "CQI Feedback Scheme for EUTRA," 3GPP TSG RAN1#43, Seoul, Korea, Nov. 7-11, 2005, 9 pages.

* cited by examiner

*Primary Examiner* — Lester Kincaid
*Assistant Examiner* — Nathan Mitchell

(57) ABSTRACT

A method and apparatus are provided for indicating to a communication unit a plurality of modulation and coding schemes (MCSs) to be utilized for communication. During a first MCS is determined for first resource blocks to be sent to a first remote unit or base station, and a second MCS is determined for a second resource block to be sent to the remote unit or base station. A message is transmitted indicating the first and the second MCS and also indicating the first resource blocks and the second resource block. Finally, a first PDU is transmitted to the remote unit or base station at a first time using the first MCS and the first resource blocks and a second PDU is transmitted to the remote unit or base station at the first time using the second MCS and the second resource block.

18 Claims, 5 Drawing Sheets

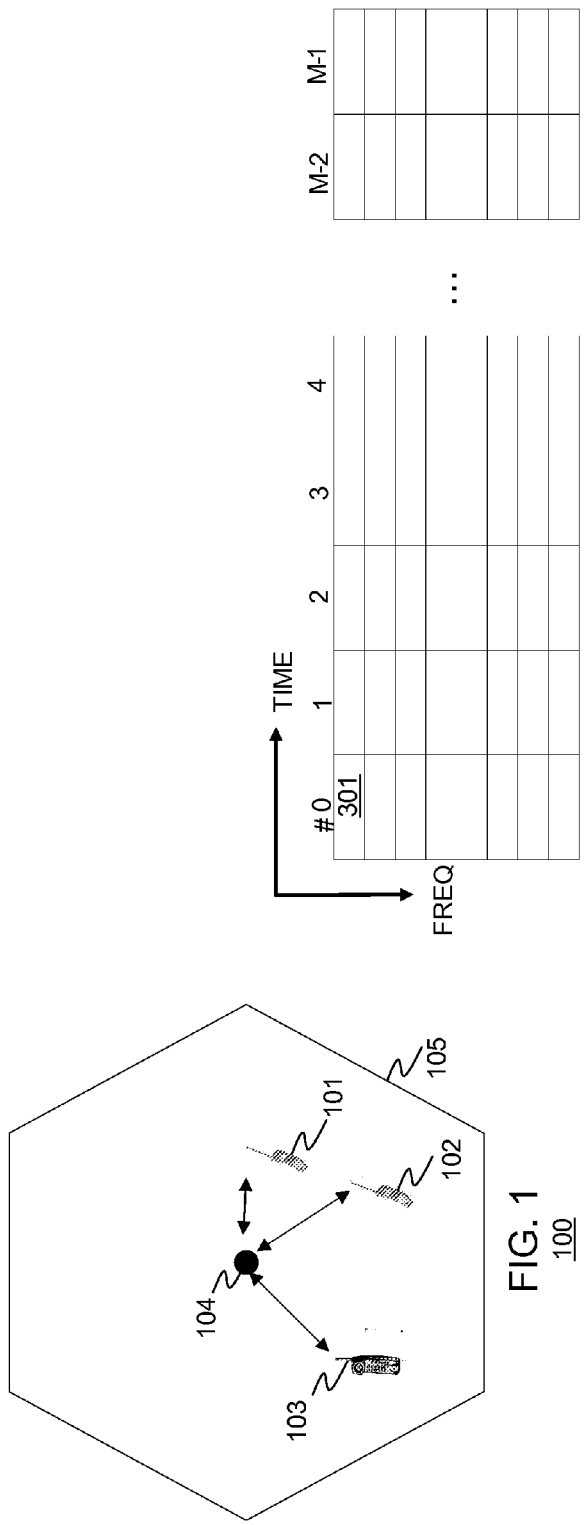
FIG. 3
FIG. 1
100
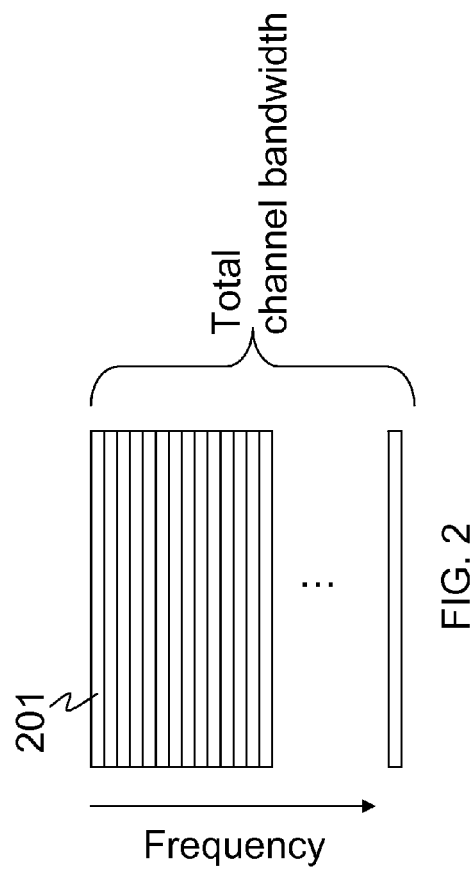
FIG. 2

500

METHOD AND APPARATUS FOR TRANSMISSION WITHIN A MULTI-CARRIER COMMUNICATION SYSTEM

FIELD OF THE TECHNIQUE PROVIDED

The present invention relates generally to resource allocation and in particular, to a method and apparatus for allocating resources and associated modulation/coding schemes to a user.

BACKGROUND OF THE TECHNIQUE PROVIDED

Many modern orthogonal frequency division multiplexed (OFDM) system proposals include the capability to support frequency-selective resource allocation. During frequency-selective resource allocation the channel bandwidth is divided into several sub-bands, which may be called tiles or resource blocks. Each resource block includes several adjacent OFDM subcarriers and may span multiple OFDM symbol periods. For example, a resource block size that has been considered in the 3gpp long term evolution (LTE) standardization effort is 12 adjacent subcarriers by 14 OFDM symbol periods. The use of resource blocks enables data allocation to a particular user to be made on the resource block having the best channel quality.

However, when a high data rate needs to be supported to/from a user, it may be necessary to allocate multiple resource blocks (over frequency) to the user. This results in the difficulty of how to treat the multiple resource block allocation. In one possible approach, the modulation and coding scheme (MCS) could be chosen independently for each of the allocated resource blocks. However, this approach can be inefficient when the set of available modulation coding schemes is limited, because the quality of the best resource block may be much higher than is actually needed for the supporting the highest-rate MCS available in the system. Another possible approach is to utilize a single MCS over all of the allocated resource blocks, where the codeword spans all of the allocated resource blocks to provide frequency diversity. The problem with this approach is that it may results in a lower data rate or throughput than the first approach. Therefore, there is a need for an improved method and apparatus for allocating resources and associated modulation/coding schemes to a user.

BRIEF DESCRIPTION OF THE DRAWINGS

FIG. 1 is a block diagram of a communication system.

FIG. 2 illustrates multiple subcarrier transmission for the communication system of FIG. 1.

FIG. 3 is an illustration of a resource block for an OFDM system.

DETAILED DESCRIPTION OF THE DRAWINGS

Figure 4:
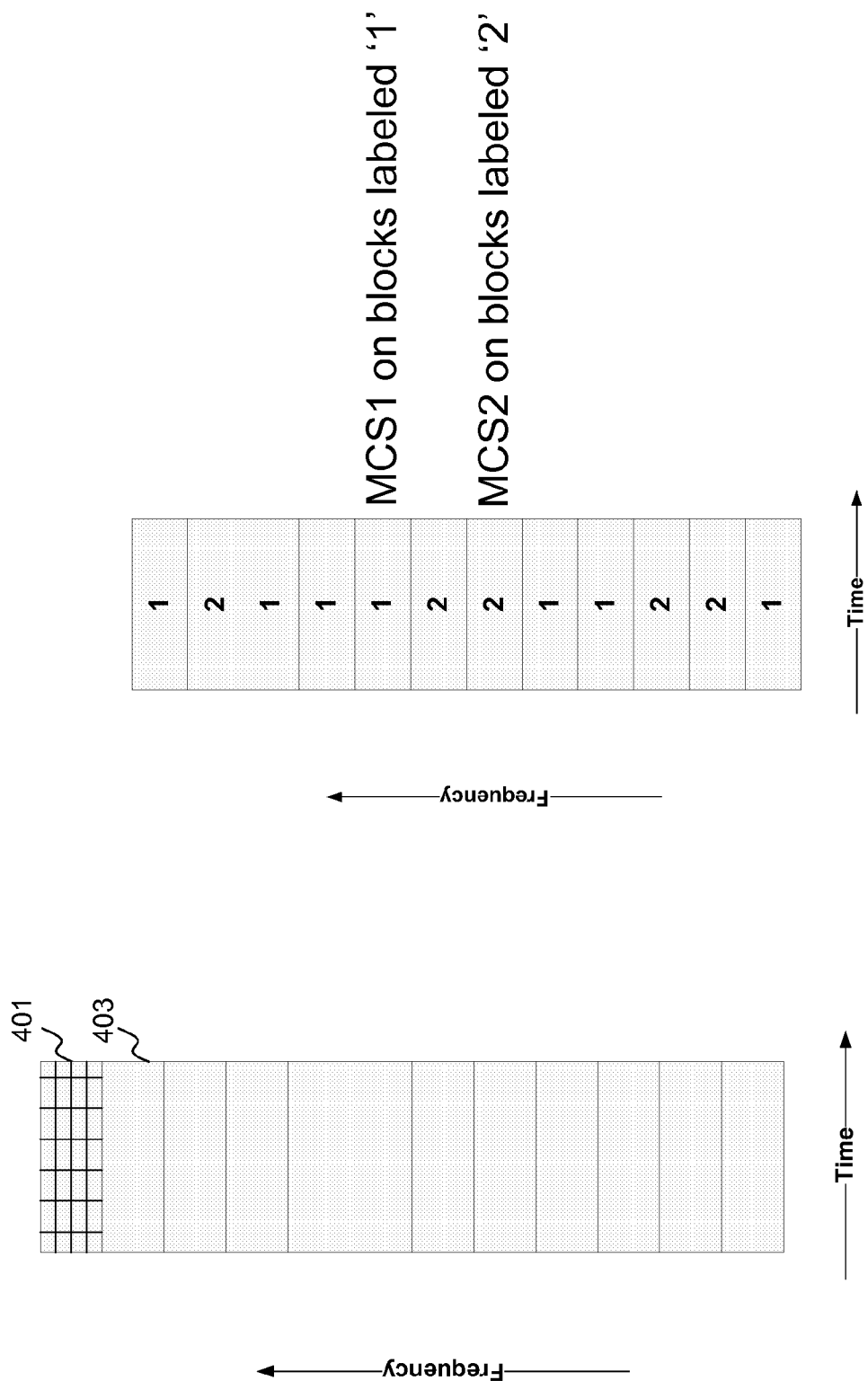
FIG. 4 describes an exemplary frame structure.

In order to address the above-mentioned need, a method and apparatus are provided for indicating to a communication unit a plurality of modulation and coding schemes (MCSs) to be utilized for communication. During a first MCS is determined for first resource blocks to be sent to a first remote unit or base station, and a second MCS is determined for a second resource block to be sent to the remote unit or base station. A message is transmitted indicating the first and the second MCS and also indicating the first resource blocks and the second resource block. Finally, a first PDU is transmitted to the remote unit or base station at a first time using the first MCS and the first resource blocks and a second PDU is transmitted to the remote unit or base station at the first time using the second MCS and the second resource block.

The above technique provides an improved method for determining what resources to allocate to a user, and what modulation/coding schemes (MCSs) should be used on those resources (e.g., for improved link adaptation performance). The above-technique takes into account the fact that the set of available MCSs is limited, and that the channel quality may be higher on certain resources than is necessary to support the highest-rate MCS from the set of available MCSs. The technique provided performs the resource allocations and MCS selections in such a way as to take advantage of excess signal quality to increase the overall data rate when multiple resources (e.g., multiple resource blocks over frequency) are allocated to the user.

Different sets of resources assigned to a user over frequency may carry different packet data units (PDUs) for that user. The technique provided also provides signaling methods that reduce the signaling overhead for identifying the resources and MCSs that should be assigned to the user.

The present invention encompasses a method for indicating to a communication unit a plurality of modulation and coding schemes (MCSs) to be utilized for communication. The method comprises the steps of determining a first MCS for first resource blocks to be sent to a first remote unit or base station, determining a second MCS, differing from the first MCS, for a second resource block to be sent to the remote unit or base station, and transmitting a message indicating the first and the second MCS and also indicating the first resource blocks and the second resource block. A first PDU is transmitted to the remote unit or base station at a first time using the first MCS and the first resource blocks, and a second PDU is transmitted to the remote unit or base station at the first time using the second MCS and the second resource block.

The present invention additionally encompasses a method comprising the steps of determining a first quality index for first resource blocks, determining a relative quality index for at least a second resource block, wherein the relative quality index is based on a quality of the at least second resource block relative to a quality of the first resource blocks, transmitting a message indicating the first quality index and the relative quality index, wherein the message causes a receiver to determine a first modulation and coding scheme for the first resource blocks and a second modulation and coding scheme for the at least second resource block. In this method, the number of bits used to represent the first quality index may differ from a number of bits used to represent the relative quality index.

The present invention additionally encompasses an apparatus comprising logic circuitry performing the steps of determining a first MCS for first resource blocks to be sent to a first remote unit or base station and determining a second MCS, differing from the first MCS, for a second resource block to be sent to the remote unit or base station. A transmitter is provided for transmitting a message indicating the first and the second MCS and also indicating the first resource blocks and the second resource block, transmitting a first PDU to the remote unit or base station at a first time using the first MCS and the first resource blocks, and transmitting a second PDU to the remote unit or base station at the first time using the second MCS and the second resource block.

The present invention additionally encompasses an apparatus comprising logic circuitry performing the steps of determining a first quality index for first resource blocks, determining a relative quality index for at least a second resource block, wherein the relative quality index is based on a quality of the at least second resource block relative to a quality of the first resource blocks. A transmitter is provided for transmitting a message indicating the first quality index and the relative quality index, wherein the message causes a receiver to determine a first modulation and coding scheme for the first resource blocks and a second modulation/coding scheme for the at least second resource block.

For the description below, a packet data unit (PDU) can be considered as a particular block of data over which a single modulation and coding scheme (MCS) (e.g., QPSK modulation with R=½ turbo coding) is present. A PDU may contain one or more codewords, or a portion of a single codeword, and multiple PDUs having the same MCS may be present.

Turning now to the drawings, wherein like numerals designate like components, FIG. 1 is a block diagram of communication system 100. Communication system 100 comprises one or more cells 105 (only one shown) each having a base transceiver station (BTS, or base station) 104 in communication with a plurality of remote, or mobile units 101-103. (Remote units 101-103 may also be referred to as communication units, User Equipment (UE), mobiles, or simply users, while base station 101 may also be referred to as a communication unit or simply Node-B). In the preferred embodiment of the present invention, communication system 100 utilizes an Orthogonal Frequency Division Multiplexed (OFDM) or multi-carrier based architecture. The use of transmit diversity may be employed as well. When using transmit diversity, base station 104 employs multiple antennas (not shown in FIG. 1) to transmit multiple data streams across multiple OFDM subcarriers to one or more receiving devices 101-103. Base station 104 may also use spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques.

Base station 101 comprises a transmitter and receiver that serve a number of remote units within a sector. As known in the art, the entire physical area served by the communication network may be divided into cells, and each cell may comprise one or more sectors. Base station 101 may employ multiple transmit antennas and/or multiple receive antennas to serve each sector in order to provide various advanced communication modes (e.g., adaptive beam forming, transmit/receive diversity, transmit/receive Spatial Division Multiple Access (SDMA), multiple stream transmission/reception, etc.).

As one of ordinary skill in the art will recognize, during operation of an OFDM system, multiple subcarriers (e.g., 300 subcarriers, as considered for one mode of 3gpp LTE) are utilized to transmit wideband data. This is illustrated in FIG. 2. As shown in FIG. 2 the wideband channel is divided into many narrow frequency bands (subcarriers) 201, with data being transmitted in parallel on subcarriers 201. In addition to OFDM, communication system 100 utilizes Adaptive Modulation and Coding (AMC). With AMC, the modulation and coding format of a transmitted data stream for a particular receiver is changed based on an expected received signal quality (at the receiver) or link quality for the particular frame being transmitted.

The modulation and coding scheme may change on a frame-by-frame basis (where a frame could be defined as one or more OFDM symbol periods) in order to track the channel quality variations that occur in mobile communication systems. Thus, resource blocks or links with high quality are typically assigned higher order modulations rates and/or higher channel coding rates with the modulation order and/or the code rate decreasing as quality decreases. For those receivers experiencing high quality, modulation schemes such as 16 QAM, 64 QAM or 256 QAM are utilized, while for those experiencing low quality, modulation schemes such as BPSK or QPSK are utilized. The selected modulation and coding may only roughly match the current received signal quality for reasons such as channel quality measurement delay or errors, channel quality reporting delay or errors, efforts to measure or predict current and future interference, and efforts to measure or predict the future channel.

Multiple coding rates may be available for each modulation scheme to provide finer AMC granularity, to enable a closer match between the quality and the transmitted signal characteristics (e.g., R=¼, ½, and ¾ for QPSK; R=½ and R=⅔ for 16 QAM, etc.). Note that adaptive modulation and coding (AMC) can be performed in the time dimension (e.g., updating the modulation/coding every $N_t$ OFDM symbol periods) or in the frequency dimension (e.g., updating the modulation/coding every $N_{sc}$ subcarriers) or a combination of both. The combination of a particular modulation scheme (e.g., 16-QAM) with a particular coding scheme (e.g., R=½ turbo coding) can be referred to as an MCS. Each MCS that is used in a system may have an associated data rate value which is preferably normalized to units of information bits per symbol. For example, the MCS of R=½ QPSK can provide 1 information bit per symbol (overheads, such as tail bits, if present, could also be factored into the rate value, if desired). For convenience, the rate value of an MCS will be referred to as MCSR. An example set of MCSs is shown in Table 1.

TABLE 1

| MCS (or MCS index) | Modulation | Code Rate | MCSR |
|---|---|---|---|
| 1 | BPSK | ½ | 0.5 |
| 2 | QPSK | ½ | 1 |
| 3 | QPSK | ¾ | 1.5 |
| 4 | 16-QAM | ½ | 2 |
| 5 | 64-QAM | ½ | 3 |
| 6 | 64-QAM | ¾ | 4.5 |
| 7 | 64-QAM | 1 (uncoded) | 6 |

FIG. 3 illustrates the concept of Resource Blocks (RB). One type of resource block consists of one or more subcarriers occupying one or more OFDM symbols. For instance, one resource block may be a tile of 12 subcarriers by 14 OFDM symbols. Not all of the modulation symbols within a RB may be available for data payload transmission, as some of the modulation symbols may be used for other purposes such as control channels or reference (e.g., pilot) signals. Moreover, not all of the symbols of an RB need to be assigned to a single user. For example, some of the symbols could be assigned to a first user and other symbols could be assigned to a second user.

FIG. 4 illustrates an exemplary frame structure using the resource block structure of FIG. 3. As shown in FIG. 4, the total bandwidth is divided into several resource blocks (such as 401 and 403). As shown in detail for resource block 401, each resource block may have the structure of FIG. 3. To simplify signaling and reduce signaling overhead, a resource block is preferably defined as the atomic resource allocation a user can obtain in a single frame. One possibility is to assign all the resource blocks to one user and one Packet Data Unit (PDU). Another possibility is to assign several users in the frame by giving them different resource blocks. For example, one user may be allocated resource block 401, and another user resource block 403. Yet another possibility is to allocate the entire frame to one user, but to share the resource blocks amongst one or more PDUs. For instance, resource block 401 may be allocated to user 1 for PDU1, and resource block 402 may be allocated to user 2 for PDU2. Other possibilities exist as well.

Allocating one or more PDUs for the same user in the same frame with each PDU being assigned its own MCS can bring significant performance benefits. A PDU encoded with an MCS will preferably comprise at least one error-correction codeword, such as a turbo encoded codeword. These codewords may be called forward error correction (FEC) codewords. In some cases, a PDU encoded with a MCS may comprise more than one FEC codeword, for example when the PDU is larger than a maximum number of information bits that can be included within a single FEC codeword. The codeword or codewords associated with a PDU may be communicated on the same ARQ or hybrid ARQ (HARQ) channel, or may be communicated on separate ARQ or HARQ channels. It is also possible that spreading with or without multi-code transmission can be used either in addition to or instead of FEC for one or more MCS levels. Like FEC, spreading introduces memory across the transmitted data.

Figure 5:
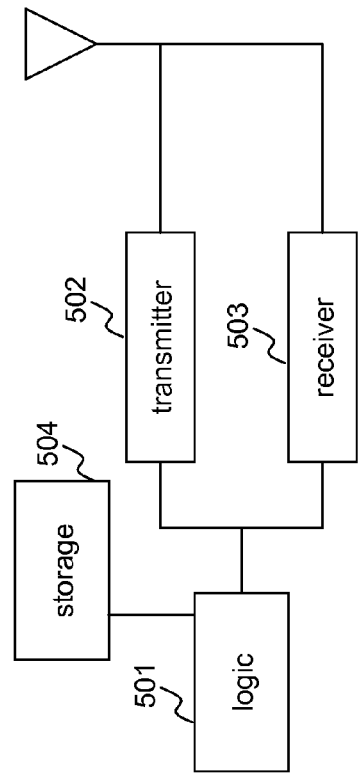
FIG. 5 is a block diagram of equipment that may be utilized as either a base station or user equipment.

FIG. 5 is a block diagram of equipment 500 that may be utilized as either a base station or user equipment. As shown, equipment 500 comprises logic circuitry 501, transmit circuitry 502, receive circuitry 503, and storage (database) 504. Storage 504 serves to store index values for various modulation and coding schemes or quality levels. For example, and index of 1 could correspond to QPSK ⅛, an index of 2 to QPSK ¼, etc. In another embodiment, if the exponential effective SNR mapping methodology is used, the beta values and the corresponding static $E_s/N_0$ thresholds can be stored in 504.

Logic circuitry 501 preferably comprises a microprocessor controller, such as, but not limited to a Freescale PowerPC microprocessor. In the preferred embodiment of the present invention logic circuitry 501 serves as means for controlling equipment 500, and as means for analyzing received message content, and means for determining modulation and coding schemes for various resource blocks. Transmit and receive circuitry 502-503 are common circuitry known in the art for communication utilizing well known OFDM protocols, and serve as means for transmitting and receiving messages.

Figures 6, 7:
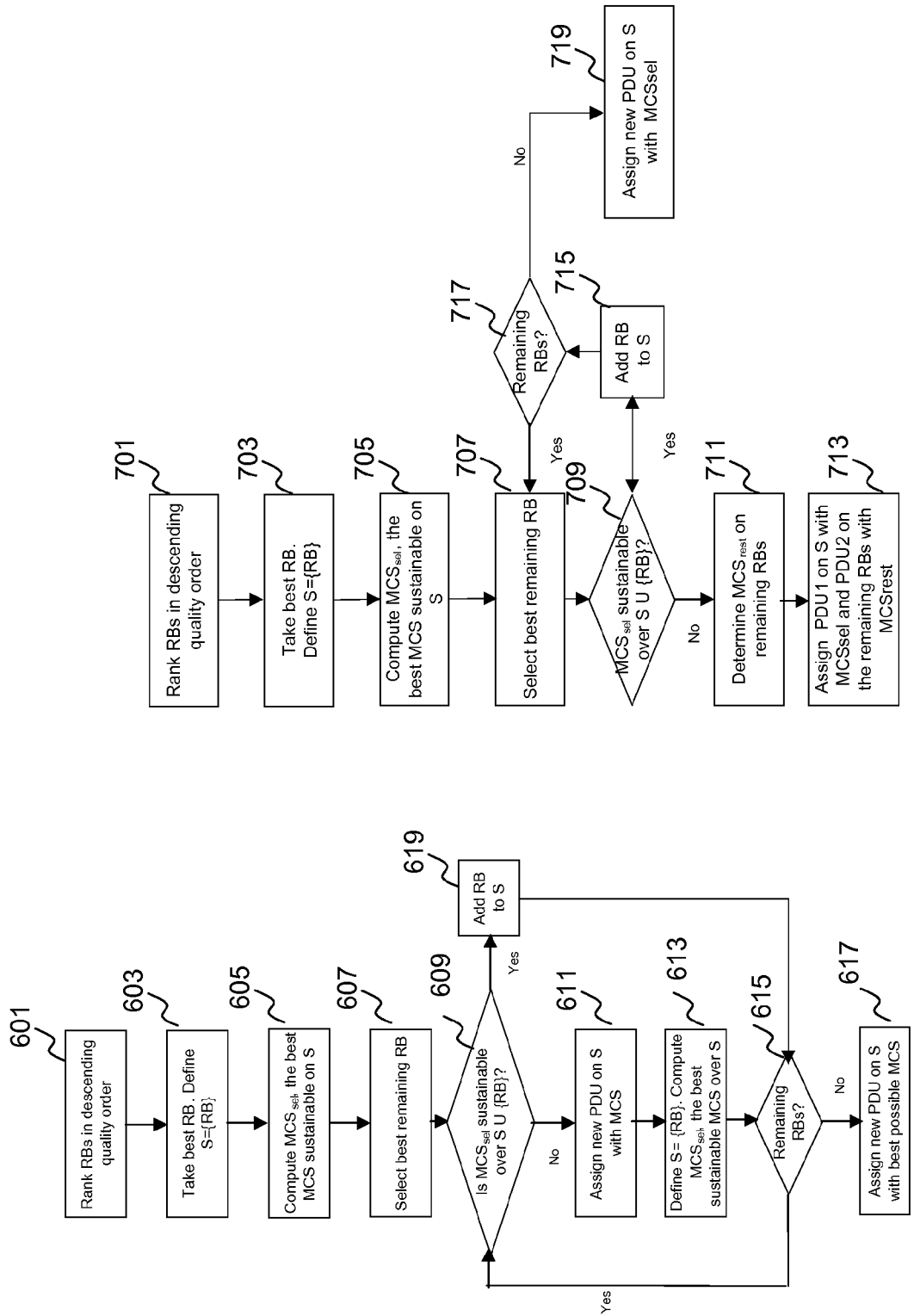
FIG. 6 is a flow chart showing operation of the apparatus of FIG. 5 when acting as a base station.
In FIG. 7, is a flow chart showing the operation of the apparatus of FIG. 5 when assigning at most two PDUs.

FIG. 6 is a flow chart showing operation of the apparatus of FIG. 5 when acting as a base station. In particular, the logic flow of FIG. 6 illustrates one example of implementing such a process where more than one PDU, each with its own MCS, is assigned to a single user. The logic begins at step 601 where a set of RBs (e.g., all of the RBs across the channel bandwidth, or a subset of the RBs) are ranked by logic circuitry 501 in descending quality order so that the first ranked RB of the set is the RB where the best radio performance (e.g., highest link quality, highest MCS, signal-to-noise ratio (SNR), etc.) can be expected (e.g., based on signal quality measurements, or channel quality feedback information), and the last ranked RB of the set is the one where the worst performance is expected. Channel quality information may, for example, be received in receiver 503. At step 603, a first RB allocation S is initiated by logic circuitry 501 by initializing S to the first RB (the best) of the set. At step 605, $MCS_{sel}$, the best sustainable MCS over S is determined by logic circuitry 501. An example criterion for a best sustainable MCS is an MCS that if assigned provides the highest possible data rate (e.g., highest MCSR) for an acceptable probability of successful transmission. At step 607, the best remaining RB of the set (i.e., excluding the RB that was selected at step 603) is selected by logic circuitry 501. At step 609, an evaluation is performed by logic circuitry 501 to determine whether $MCS_{sel}$ could still be sustained over an allocation spanning both S and this best remaining RB (i.e., a resource allocation that includes both the highest ranked RB and the second highest ranked RB). If yes, then logic circuitry 501 adds the best remaining RB to S at step 619, and the logic flow continues to step 615 where logic circuitry 501 determines whether there are any remaining RBs left from the set that have not yet been considered. If the determination is yes in step 615, the process returns to step 607 followed again by step 609.

If the result of step 609 is no, then the total allocation S over which $MCS_{sel}$ can be sustained has been determined and can be assigned along with $MCS_{sel}$ to the user in step 611 (or stored in storage 504 until the entire process flow is complete, for later use). The process of assignment comprises assigning a PDU to be transmitted with transmitter 502 on the RBs in the allocation with MCSsel.

Continuing, the logic flow continues to step 613 where logic circuitry 501 re-initializes S to the best remaining RB of the set as was determined in step 607. Also in step 607, a new value of $MCS_{sel}$ is determined by logic circuitry 501 for the newly defined S. The logic flow then proceeds to step 615 where logic circuitry 501 determines whether there are any remaining RBs left from the set that have not yet been considered. If the determination of step 615 is yes, then the logic flow returns to step 607. If the determination of step 607 is no, then all of the RBs of the set have been considered and the current allocation S and $MCS_{sel}$ can be assigned by logic circuitry 501 to the user along with all of the previously determined allocations. Note that each of the allocations S has a different MCS. Also note that the RBs comprising a particular allocation based on this process are not necessarily contiguous.

The process in FIG. 6 could potentially assign several PDUs to a single user. However, it is expected that allowing only two PDUs to be assigned to a user will provide most of the performance benefit of the technique provided while simplifying the process and potentially reducing signaling overhead.

In FIG. 7, is a flow chart showing the operation of the apparatus of FIG. 5 when assigning at most two PDUs. The logic begins at step 701 where the RBs of the set are ranked by logic circuitry 501 in descending quality order so that the first RB is the RB where the best radio performance can be expected, and the last RB is the one where the worst performance is expected. Then, at step 703, a first RB allocation S is izinitialized by logic circuitry 501 by initiating S to the first RB (the best). At step 705, $MCS_{sel}$, the best sustainable MCS over S is determined by logic circuitry 501. At step 707, the best remaining RB is selected by logic circuitry 501. At step 709, logic circuitry 501 evaluates whether $MCS_{sel}$ can be sustained over an RB allocation spanning S and this best remaining RB. In set notation, this is the set $S \cup \{RB\}$. If yes, the best remaining RB is added by logic circuitry 501 to S at step 715. The logic flow then continues at step 717 where logic circuitry 501 determines whether there are some remaining RBs in the set to process: if yes, the logic flow returns to step 707. There are no more remaining RBs, the logic flow continues step 719 where logic circuitry 501 allocates a first PDU over S (possibly the totality of the available RBs) and instructs transmitter 501 to transmit using $MCS_{sel}$. If on the other hand, at step 709, it is determined that $MCS_{sel}$ cannot be sustained over an RB allocation spanning S and the best remaining RB, logic circuitry 501 evaluates $MCS_{rest}$, the best sustainable MCS over the all the remaining RBs of the set not part of S at step 711. At step 713, by logic circuitry 501 assigns a first PDU to S to be transmitted with $MCS_{sel}$ and a second PDU to be transmitted over all the remaining RBs of the set (that are not part of S) to be transmitted with $MCS_{rest}$.

Figure 8:
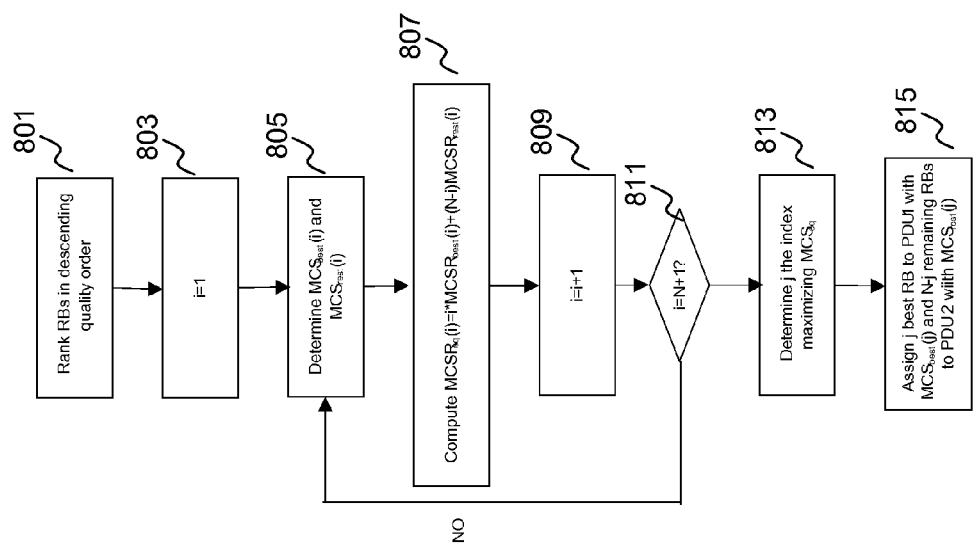
In FIG. 8, is a flow chart showing the operation of the apparatus of FIG. 5 when assigning at most two PDUs.

Another process to assign at most two PDUs for a same user in a same frame is shown in FIG. 8. The process described in FIG. 8 may potentially provide increased band-averaged link efficiency or data rate as compared to the process of FIG. 7, at the cost of increased complexity in the process. The logic begins at step 801 where a set of RBs are ranked by logic circuitry 501 in descending quality order so that the first RB is the RB where the best radio performance can be expected, and the last RB is the one where the worst performance is expected. At step 803, an index is initialized by logic circuitry 501. At step 805, two MCSs are determined by logic circuitry 501: $MCS_{best}(i)$, the best sustainable MCS on the i best RBs, and $MCS_{rest}(i)$, the best sustainable MCS on the N-i remaining RBs. The rate values associated with $MCS_{best}(i)$ and $MCS_{rest}(i)$ are denoted as $MCSR_{best}(i)$ and $MCSR_{rest}(i)$, respectively. At step 807, another value, $MCSR_{eq}(i)$, which represents the equivalent or net MCSR over the entire set of RBs is computed by logic circuitry 501, and is preferably computed based on the following equation:

$$MCSR_{eq}(i)=i*MCSR_{best}(i)+(N-i)*MCSR_{rest}(i).$$

At step 809, by logic circuitry 501 increments i by 1. At step 811, logic circuitry 501 compares i against N+1. If i<N+1, and the logic flow returns to step 805. If i=N+1, j, the index that maximized $MCSR_{eq}$ is determined by logic circuitry 501 at step 813. At step 815, a first PDU is allocated by logic circuitry 501 for the j best RBs and logic circuitry 501 will instruct transmitter 502 to transmit with $MCS_{best}(j)$, and a second PDU for the remaining RBs ($MCS_{rest}(j)$).

In an additional aspect, power redistribution can optionally be employed in order to further improve system performance. For instance, when two MCSs have been assigned using the algorithm described in FIG. 8, the excess power on both PDU1 (with $MCS_1$) and PDU2 (with $MCS_2$) can be gathered: for each PDU, just enough power is allocated to sustain the selected MCS. The remaining power can then be re-distributed: one policy can be to redistribute power in order to add RBs initially allocated to PDU2, the PDU with the lower MCSR, to PDU1, the PDU with the best MCS. The RBs, when sorted from best to worst are then taken sequentially to improve the MCS on the considered RB by some amount. Alternatively, the RBs can be selected in a way that power redistribution will maximize the link efficiency (averaged over the two PDUs, such as the equivalent or net MCSR). Power redistribution is particularly useful in a multi-user context where users are likely to be scheduled on their best RBs and when the resource blocks or bins allocated to the second PDU are likely to be used for collision resolution.

Any of the techniques previously described can be applied either on the uplink or on the downlink, regardless of the duplexing method (e.g., TDD or FDD). Also, various modifications can be made to the processes while remaining within the scope of the technique provided, or different processes could be used, while remaining within the scope of the technique provided, that provide the same effect of allocating multiple MCSs over frequency to a single user while taking advantage of excess signal quality on one or more RBs to expand the number of RBs that can effectively support/utilize a particular MCS.

An additional aspect of the technique provided involves improved signaling/messaging. The following embodiments will be described for the case where the user transmits channel quality information to a base station in order to assist the base station in determining the sets of RBs and their associated MCSs to use when transmitting to the user on the downlink but the technique provided is applicable to other scenarios as well (e.g., role of downlink and uplink reversed, role of base station and user reversed, etc.).

The use of differing modulation and coding schemes for each set of resource blocks requires messaging to identify each set of resource blocks and the modulation and coding scheme utilized on each of the sets of resource blocks. Supplying this information increases the signaling overhead, and, in order to be as efficient as possible, the amount of feedback needs to be reduced.

In order to address this issue, user equipment can determine channel quality information (CQI) comprising of, for example, the set of resource blocks that it recommends to be included in each allocation along with a channel quality indicator (e.g., SNR, SINR, or MCS index) for each of the recommended allocations. The user equipment can then feedback the channel quality information (CQI) of each set of resource blocks in a single message so that the proper MCS may be chosen for each of the set of resource blocks. For example, when two sets of resource blocks are being utilized, the user equipment will be determining first quality information and a corresponding first index for a first set of resource blocks and determining second quality information for a second set of resource blocks. Quality index values for the first and the second quality information will be determined and a single message will be transmitted from the user equipment indicating the first and the second qualities. The first and the second qualities may be represented individually, or by linking the value of the one quality index to the other (e.g., by the first quality index, and a difference between the second index and the first quality index, respectively). More particularly, for the linked case, the second quality information can be relative to the first quality information and can be communicated by a relative quality index as a difference of quality index between the first and second quality index. The relative quality index enables the receiver to determine the second quality index when both the first quality index and the relative quality index are known. In one example, a single bit indicator may be used to signal the difference of quality index such that if the bit value is "0", then index of $MCS_2$ is index of $MCS_1$ minus 1 and if the bit value is "1", then index of $MCS_2$ is index of $MCS_1$ minus 2. Additionally, the message may comprise an indication of which resource blocks should use the first MCS (or which resource blocks are associated with the first quality value) and which resource blocks should use the second MCS (or which resource blocks are associated with the second quality value). A bitmap representation may be used to efficiently convey this information. An exemplary CQI message may be as follows:

1. $MCS_1$
2. $MCS_2$
3. A bitmap message of N bits, where N is the number of available resource blocks. A bit value of "1" at position k would mean that $MCS_1$ is associated with RB number k, whereas a bit value of "0" at position k would mean that $MCS_2$ is associated with RB number k.

Note that with this type of a CQI message, the user equipment is indicating to the base station that when the base station subsequently transmits to the user equipment, a first PDU may be supported with best sustainable $MCS_1$ on all RBs with a bit value of "1", and a second PDU may be supported with best sustainable $MCS_2$ on all RBs with a bit value of "0", where each PDU is separately modulated and coded. Also note that if the channel quality is time varying, a new CQI message, based on the current channel conditions, may need to be periodically transmitted by the user equipment to enable the quality changes to be tracked.

The actual RBs and MCS used for transmission may be the same or different than those on which CQI is reported. Also, the CQI message may not all be transmitted in a single frame. For example, a frame might contain either $MCS_1$ or $MCS_2$ or part of the bitmap. As another example, one frame may contain $MCS_1$ and part of the bitmap, and another may contain $MCS_2$ and part of the bitmap. In another example, a CQI message in some frames may be configured to provide a differential update to information that was transmitted in a previous frame or previous frames.

$MCS_1$ and $MCS_2$ can be represented by an MCS index. In order to further reduce feedback, $MCS_2$ may be sent relative to $MCS_1$: in other words, the index corresponding to $MCS_2$ may be sent as a difference between the index corresponding to $MCS_1$ and the index corresponding to $MCS_2$. For example, the difference values represented by the corresponding bit(s) in the message may be fixed, or could be dependent on the value of $MCS_1$, or other factors. In general, to reduce overhead, $MCS_2$ may be dependent on any information known by both the base station and the remote unit. Some examples of this other information may be the value of $MCS_1$, or a band-averaged SNR value. For instance, the user equipment may feedback a band-average channel quality indicator (e.g., SNR) in addition to other CQI information. In one example of utilizing the band-average CQI, for a band-averaged SNR greater than 10 dB, a value of "1" ("0", respectively) for $MCS_2$ may mean that for the second set of resource blocks, the transmitter should use the MCS index corresponding to the MCS index for $MCS_1$ minus one (minus two, respectively). For instance, for a band-averaged SNR greater than 10 dB, a value of "1" ("0", respectively) for $MCS_2$ may mean that for the second set of resource blocks, the transmitter should use the MCS index corresponding to the MCS index for $MCS_1$ minus two (minus three, respectively). Also, alternatively, instead of sending MCS index values, the user equipment may transmit any radio link quality information that may be used to determine an MCS, such as an SNR value, an effective SNR value, a mutual information value, or a data rate value. For example, depending on the band-averaged SNR value and a single bit being used for $MCS_2$, a value of "1" may correspond to a reduction of 1 bit per symbol of spectral efficiency, while a value of "0" may correspond to a reduction of 0.5 bit per symbol of spectral efficiency. Alternatively, $MCS_2$ could also always be selected to be a known value (e.g., QPSK R ⅓). In another example, in order to reduce signaling, the MCSs and set of RBs selected for PDU1 and PDU2 can be decided such that there is a finite set of differences possible between the indices of MCS1 and MCS2. This further reduces the number of bits to code the difference between the $MCS_2$ index and the $MCS_1$ index.

After the base station determines which resource blocks and MCSs to actually assign to the user equipment (for the user equipment to receive information from the base station), the assignment information can be communicated to the user equipment using a downlink control channel. In order to limit the message size of the control channel transmitted by the base station to the remote unit, several possibilities are listed below for the assignment message format:

EXAMPLE 1

Fixed Size Assignment, One HARQ Channel

For some embodiments, the control message size may be fixed for each user equipment. In such a case, the following fields may be included in the fixed size assignment message:

1. HARQ channel ID.
2. User ID;
3. The set of resource blocks (RB1) used for PDU1;
4. The modulation and coding scheme for RB1;
5. The set of resource blocks (RB2) used for PDU2; and
6. The modulation and coding scheme for RB2 ($MCS_2$).

In this example, the same HARQ channel is used for both PDU1 and PDU2, with the consequence that if only one of the two transmitted PDUs cannot be decoded, both will have to be retransmitted. The user ID is a uniquely assigned identifier so that it can be determined to which user equipment this resource assignment message applies. The MCS can be signalled in a way similar than for the CQI information. In particular, $MCS_2$ can be indicated with an index relative to $MCS_1$ with a process similar to the one described above to save signalling bits. Similarly, the two sets of resource blocks can be indicated with a bitmap field similar to the CQI bitmap field. It is implicitly indicated that a separate Packet data unit (PDUs) will then be transmitted over each set of resource blocks during the same time period, and that each PDU will be separately modulated and coded. The user ID may be a MAC ID.

EXAMPLE 2

Fixed Size Assignment, Two HARQ Channels

In example 1, when sending a single HARQ channel ID, failure on one of the two transmitted PDUs will trigger the retransmission of the two transmitted PDUs, even if one was correctly received. In order to avoid this problem, the base station may send two HARQ channel IDs in the assignment message (one for PDU1 and another for PDU2). In addition, the HARQ channel ID for PDU2 may be implicitly signalled: for instance, if HARQ_ID1 is used for PDU1, HARQ_ID2 may be automatically set up to HARQ_ID1+1 modulo the number of HARQ channels.

EXAMPLE 3

Joint Assignment, One HARQ Channel

Since more than one user may be scheduled in one frame, the base station can take advantage of this multi-user situation by jointly coding all the assignment messages into a single assignment message. For example, the base station may transmit:
1. A list of user IDs
2. The following fields, M times (where M is the number of user equipments scheduled in the same frame):
   a. HARQ channel ID
   b. $MCS_1$
   c. $MCS_2$
3. A bitmap region with the following fields, N times (where N is the number of available resource blocks):
   a. Short user equipment ID
   b. One bit, where "0" means that this particular resource block is for the first set of resource blocks (corresponding to PDU1), and "1" means that this particular resource block is for the second set of resource blocks (corresponding to PDU2)

The short UE ID is a unique identifier for a particular user ID and is valid for this frame only. It can be derived form the order in which the M user IDs are transmitted: for instance, the user whose user ID is listed first would be assigned the short ID of value "0" (in decimal), the second, a short ID of value "1", etc. Alternatively, the short ID can be explicitly signalled when the list of user IDs is transmitted, and may be valid for more than a frame.

EXAMPLE 4

Joint Assignment, Two HARQ Channels

This embodiment is similar to the previous one, but two HARQ channel IDs are signalled: one for the first PDU and one for the second PDU.

EXAMPLE 5

Joint Assignment with Variable Control Assignment Size

With example 3, the size of the control assignment message is fixed. While this is suitable if all the users transmit two PDUs, it may result in a waste of resources if some users transmit only one PDU. A solution in this case consists in sending the information for PDU2 only when needed. The format of the resource assignment message can be as follows:
1. A list of user IDs
2. The following fields, M times (where M is the number of user equipments scheduled in the same frame):
   a. One bit to indicate if the assignment is for one or two PDUs
   b. HARQ channel ID
   c. $MCS_1$
   d. $MCS_2$ (if two assignments)
3. A bitmap region with the following fields, N times (where N is the number of available resource blocks):
   a. Short user equipment ID
   b. If only one assignment, nothing else. If more than one assignment, one bit, where "0" means that this particular resource block is for the first set of resource blocks (corresponding to PDU1), and "1" means that this particular resource block is for the second set of resource blocks (corresponding to PDU2)

It is of course possible to signal two HARQ channel IDs if desired.

A Packet data unit (PDUs) will then be communicated over each set of resource blocks during the same time period. Each PDU will be separately modulated and coded.

The system may support multiple antenna transmission, such as transmit diversity, open loop MIMO, closed loop beamforming, or closed loop MIMO. A multiple antenna format may include possibly different complex transmit antenna weights applied to each resource block. A multiple antenna transmission may include multiple spatial streams on a resource block intended for a single remote unit, where on the resource block different antenna weights are used to transmit each spatial stream. These spatial streams may each be intended to have its own PDU or intended to have a single PDU for all streams, or some combination. With multi-stream transmission, there is at least one resource block on which two or more streams are transmitted by spatial multiplexing.

When multiple antennas are used to transmit multiple streams, each stream may be configured to have two PDUs each with a MCS and a RB set. A multiple antenna transmission format may be communicated in addition to the assignment information for the PDUs ($MCS_1$, set RB1, $MCS_2$, set RB2). Such communication may include an indication of the antenna transmission weights such as via a codebook. If multiple spatial streams are present and multiple PDU are intended, multiple sets of PDU1 and PDU2 (with associated $MCS_1$ and RB1) may be transmitted. For example, stream 1 may have PDU1 and PDU2, while stream 2 may have PDU3 and PDU4. To reduce signaling, RB1=RB3 and RB2=RB4. Alternatively, stream 2 may only have a single MCS on its assigned RBS, which may be some or all of RB1 and RB2.

To reduce signaling when multiple antenna techniques are supported, the signaling may be configured to support either multi-stream MIMO or two or more PDU on non-overlapping sets of RBs. Such reconfigurable signaling may be especially efficient if the multi-stream case has two intended PDUs and two PDUs (with different RBs and MCS) are also supported. In this case, the system may have stream 1 with PDU1/$MCS_1$/RB1 and PDU2/$MCS_2$/RB2, or stream 1 PDU1/$MCS_1$ and stream 2 PDU2/$MCS_2$. For the multi-stream case, RB1 and RB2 overlap on at least one RB, and RB1 may be equal to RB2. The configuration of the signaling may be performed in a number of ways, including:
   A bit indicating multi-stream MIMO or not
   An entry in a table indexed by a multi-bit 'multi antenna' field.
   A codebook entry having a certain value to indicate 2 PDUs on a single stream
   Two codebook entries having the same value indicating 2 PDUs on a single stream
   A transmission matrix is sent that is rank 1.
   Remote unit blindly decodes control channel looking for each of two possible formats. Formats may differ physically in either number of information bits, coding rate, or seeded CRC.

Other than the overall configuration, different bit fields may be either retained or remapped. For example, both modes may require a MCS field for each PDU. If for the multi-stream configuration only a single RB allocation is present (both streams use same set of RBs) then the single stream 2 PDU case a second RB allocation may be provided, or the RB allocation may be assumed to be the inverse of the RB allocation of the first PDU on all or part of the band.

The number of streams that may be supported with multi-stream transmission is not constant. For instance, because of changes in the spatial environment, two streams may no longer be supported. When a stream is terminated, the current HARQ process on that stream can be mapped onto one of the remaining streams using a different set of RBs. One of the previously described algorithms can be used to determine the MCS on the two set of RBs. When a stream is added, the signaling for a second HARQ channel can be used.

EXAMPLE 7

Fixed Assignment Message with Power Allocation

In order to further improve system performance, it is possible to perform power allocation on a per RB basis. In that case, the message of example 1 can be reused. In addition, a bitmap message with the power allocation per RB can be transmitted. In order to limit the feedback, the power indication may be differentially encoded, with the reference power value known by both the transmitter and the receiver.

Figures 9, 10:
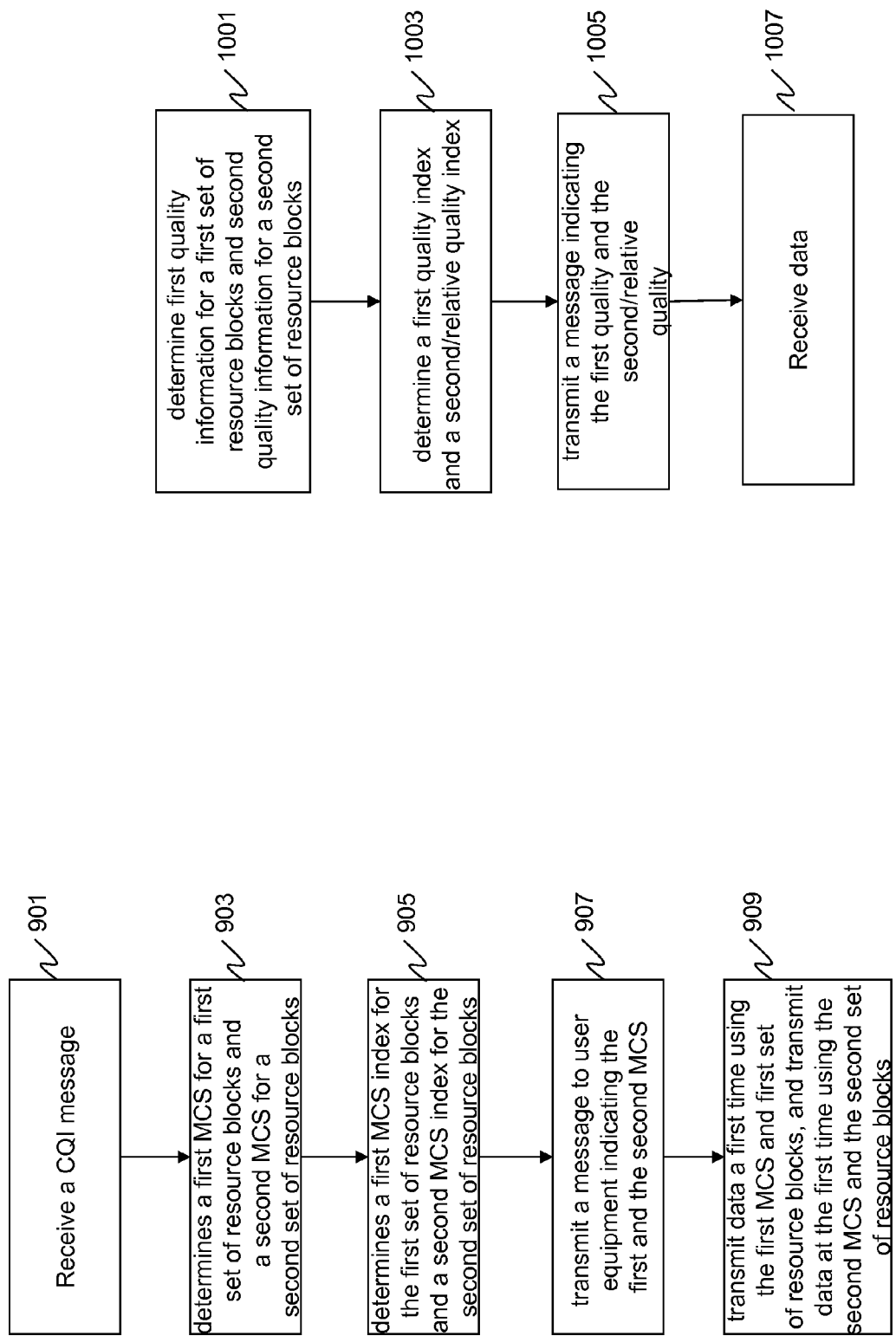
FIG. 9 is a flow chart showing operation of the apparatus of FIG. 5 when being utilized as a base station.
FIG. 10 is a flow chart showing operation of the apparatus of FIG. 5 when being utilized as user equipment.

FIG. 9 is a flow chart showing operation of equipment 500 when being utilized as a base station. During operation, a CQI message is received by receiver 503 from user equipment (step 901). As discussed above, the CQI message will comprise information on the quality of any received signal for a number of resource blocks being used. Thus, at step 901 at least first quality information is received for a first set of resource blocks, and second/relative quality information is received for a second set of resource blocks (in one of the many examples outlined above). The first and the second set of resource blocks may simply comprise one resource block. Additionally, as discussed above, each resource block comprises a contiguous set of subcarriers.

At step 903 logic circuitry 501 determines a first MCS for a first set of resource blocks and a second MCS for a second set of resource blocks. As one of ordinary skill in the art will recognize, the MCS chosen for each set of resource blocks is related to at least the perceived quality over this set of resource blocks by the user equipment. Logic circuitry then accesses storage 504 and determines a first MCS index for the first set of resource blocks and a second MCS index for the second set of resource blocks (step 905). These may be represented as a first and a second bit, the first bit indicating a set of resource blocks the first resource blocks are allocated, and the second bit indicating a second set of resource blocks the second resource block is allocated.

At step 907 logic circuitry 501 instructs transmitter 502 to transmit a message to the user equipment indicating the first and the second MCS and also indicating the first and the second resource blocks. The first and the second MCS are represented by the first and the second MCS index. Alternatively, the first and the second MCS may be represented by the first MCS index and a difference between the first MCS index and the second MCS index, respectively. Alternatively, the MCS may be signaled by any of the examples given above. Finally, at step 909 transmitter 502 transmits a first PDU to the user equipment at a first time using the first MCS and first set of resource blocks and additionally transmits a second PDU to the user equipment at the first time using the second MCS and the second set of resource blocks.

It should be noted, that while the above logic flow was directed towards a base station transmitting to a mobile, or remote unit, one of ordinary skill in the art will recognize that the above logic flow may be implemented within a remote unit that is transmitting data to a base station using multiple resource blocks. It should also be noted that when power allocation is taking place, a first power allocation for the first resource blocks and a second power allocation for the second resource block may be determined by logic circuitry 501 and a second message may be transmitted by transmitter 502 indicating the first and second power allocations. Also, when there is determined a need to send the first and the second PDUs within a single MIMO stream, a first MIMO codebook index may be transmitted within the first message. A multi-antenna field may additionally be transmitted within the first message, where the multi-antenna field indicates that transmission is not a multi-stream transmission.

When HARQ is being utilized, transmitter 502 may also transmit a single HARQ channel indicator for the first PDU sent on the first resource blocks and the second PDU sent on the second resource block. Alternatively, a first HARQ channel indicator for the first PDU sent on the first resource blocks and a second HARQ channel indicator for the second PDU sent on the second resource block may be transmitted.

FIG. 10 is a flow chart showing operation of equipment 500 when being utilized as user equipment. The logic flow begins at step 1001 where logic circuitry determines first quality information for a first set of resource blocks and a second quality information for a second set of resource blocks. Each set of resource blocks may comprise only a single resource block. At step 1003 logic circuitry accesses storage 504 and determines a first quality index and a second quality index. A quality index reflects a quality value in some predetermined format (e.g., a set of one or more bits representing a numerical quality value directly or indirectly, one or more bits that serve as a pointer into a predefined table (e.g., an MCS index in Table 1, an SINR table), etc.). The second quality index can be represented either directly, or as a relative or difference quality index from the first quality index, so the second quality can be referred to or denoted as a second/relative quality. The quality information and/or index is preferably based on at least one of SNR, effective SNR, SINR, effective SINR, mutual information, MCS, or data rate, or may comprise other quality information. Note that the feedback overhead can be reduced if relative quality is used because the number of bits used to represent the first quality index can differ from the number of bits used to represent the relative quality index. For example, a plurality of bits may be used to represent the first quality index with good accuracy, and the relative quality index may be represented with a smaller number of bits (as little as 1 bit) to reduce overhead, especially when the quality of the second resource block(s) is expected to be correlated or close to that of the first blocks.

Logic circuitry 501 then instructs transmitter 502 to transmit a message indicating the first quality and the relative quality information (step 1005). As discussed, the first quality and the relative quality are represented by the first quality index, and a relative index, respectively. The message causes a receiver to determine modulation and coding schemes for the first resource blocks and the second resource block.

Finally, at step 1007 data is received over the first and the second set of resource blocks. As discussed above, the data for each set of resource blocks will have a unique modulation and coding scheme based on the quality of each set of resource blocks.

While the technique provided has been particularly shown and described with reference to a particular embodiment, it will be understood by those skilled in the art that various changes in form and details may be made therein without departing from the spirit and scope of the technique provided. For example, in a communication system utilizing a Multiple-Input-Multiple-Output (MIMO) the signalling used for signalling two PDUs case can be reused, at least in part. For instance, if the first and second codebook indexes are identical, then it could mean that two PDUs are sent on a single stream. The MCSs for stream one could be used for PDU1. It is intended that such changes come within the scope of the following claims.

The invention claimed is:

1. A method for indicating to a communication unit a plurality of modulation and coding schemes (MCSs) to be utilized for communication, the method comprising the steps of:
   determining a first MCS for first resource blocks to be sent to a first remote unit or base station;
   determining a second MCS, differing from the first MCS, for a second resource block to be sent to the remote unit or base station;
   transmitting a message indicating the first and the second MCS and also indicating the first resource blocks and the second resource block;
   transmitting a first PDU to the remote unit or base station at a first time using the first MCS and the first resource blocks; and
   transmitting a second PDU to the remote unit or base station at the first time using the second MCS and the second resource block;
   transmitting a single HARQ channel indicator for the first PDU sent on the first resource blocks and the second PDU sent on the second resource block.

2. The method of claim 1 wherein each resource block of the first and the second resource blocks comprise a contiguous set of subcarriers.

3. The method of claim 1 wherein the first and the second MCS are represented by a first and a second MCS index, respectively within the message.

4. The method of claim 1 wherein the first and the second MCS are represented by a first and a second MCS index, respectively and the message comprises the first MCS index and a difference between the first MCS index and the second MCS index.

5. The method of claim 1 further comprising the step of:
   determining a first power allocation for the first resource blocks and a second power allocation for the second resource block and transmitting a second message indicating the first and second power allocations.

6. The method of claim 1 further comprising the steps of:
   determining a need to send the first and the second PDUs within a single MIMO stream; and
   transmitting a first MIMO codebook index within the message.

7. The method of claim 1 further comprising the step of:
   transmitting a multi-antenna field within the message, where the multi-antenna field indicates that transmission is not a multi-stream transmission.

8. The method of claim 1 wherein the message comprises a first and a second bit, the first bit indicating a set of resource blocks the first resource blocks are allocated, and the second bit indicating a second set of resource blocks the second resource block is allocated.

9. The method of claim 1 wherein the message additionally comprises:
   an identification associated with a transmitter and a bit to indicate whether the first resource blocks pertain to a first or a second set of resource blocks for the transmitter ID; and
   an identification associated with the transmitter and a bit to indicate whether the second resource block pertains to the first or the second set of resource blocks for the transmitter ID.

10. An apparatus comprising:
    logic circuitry performing the steps of:
    determining a first MCS for first resource blocks to be sent to a first remote unit or base station; and
    determining a second MCS, differing from the first MCS, for a second resource block to be sent to the remote unit or base station;
    a transmitter performing the steps of:
    transmitting a message indicating the first and the second MCS and also indicating the first resource blocks and the second resource block;
    transmitting a first PDU to the remote unit or base station at a first time using the first MCS and the first resource blocks; and
    transmitting a second PDU to the remote unit or base station at the first time using the second MCS and the second resource block;
    transmitting a single HARQ channel indicator for the first PDU sent on the first resource blocks and the second PDU sent on the second resource block.

11. The apparatus of claim 10 wherein the message comprises a first and a second bit, the first bit indicating a set of resource blocks the first resource blocks are allocated, and the second bit indicating a second set of resource blocks the second resource block is allocated.

12. A method for indicating to a communication unit a plurality of modulation and coding schemes (MCSs) to be utilized for communication, the method comprising the steps of:
    determining a first MCS for first resource blocks to be sent to a first remote unit or base station;
    determining a second MCS, differing from the first MCS, for a second resource block to be sent to the remote unit or base station;
    transmitting a message indicating the first and the second MCS and also indicating the first resource blocks and the second resource block;
    transmitting a first PDU to the remote unit or base station at a first time using the first MCS and the first resource blocks; and
    transmitting a second PDU to the remote unit or base station at the first time using the second MCS and the second resource block;
    transmitting a first HARQ channel indicator for the first PDU sent on the first resource blocks; and
    transmitting a second HARQ channel indicator for the second PDU sent on the second resource block; and
    transmitting a multi-antenna field within the message, where the multi-antenna field indicates that transmission is not a multi-stream transmission.

13. The method of claim 12 wherein each resource block of the first and the second resource blocks comprise a contiguous set of subcarriers.

14. The method of claim 12 wherein the first and the second MCS are represented by a first and a second MCS index, respectively within the message.

15. The method of claim 12 wherein the first and the second MCS are represented by a first and a second MCS index, respectively and the message comprises the first MCS index and a difference between the first MCS index and the second MCS index.

16. The method of claim 12 further comprising the step of:
    determining a first power allocation for the first resource blocks and a second power allocation for the second resource block and transmitting a second message indicating the first and second power allocations.

17. The method of claim 12 further comprising the steps of:
    determining a need to send the first and the second PDUs within a single MIMO stream; and
    transmitting a first MIMO codebook index within the message.

18. An apparatus comprising:
logic circuitry performing the steps of:
   determining a first MCS for first resource blocks to be sent to a first remote unit or base station; and
   determining a second MCS, differing from the first MCS, for a second resource block to be sent to the remote unit or base station;
a transmitter performing the steps of:
   transmitting a message indicating the first and the second MCS and also indicating the first resource blocks and the second resource block;
   transmitting a first PDU to the remote unit or base station at a first time using the first MCS and the first resource blocks; and
   transmitting a second PDU to the remote unit or base station at the first time using the second MCS and the second resource block;
   transmitting a first HARQ channel indicator for the first PDU sent on the first resource blocks; and
   transmitting a second HARQ channel indicator for the second PDU sent on the second resource block;
wherein the message comprises a first and a second bit, the first bit indicating a set of resource blocks the first resource blocks are allocated, and the second bit indicating a second set of resource blocks the second resource block is allocated.

* * * * *